United States Patent
Watanabe et al.

(10) Patent No.: US 6,578,072 B2
(45) Date of Patent: *Jun. 10, 2003

(54) NETWORK PHOTOGRAPH SERVICE SYSTEM

(75) Inventors: Michito Watanabe, Kanagawa-ken (JP); Makoto Hara, Kanagawa-ken (JP); Takashi Yatabe, Kanagawa-ken (JP)

(73) Assignee: Fuji Photo Film, Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,050

(22) Filed: Dec. 31, 1998

(65) Prior Publication Data

US 2003/0093493 A1 May 15, 2003

(30) Foreign Application Priority Data

Jan. 14, 1998 (JP) ............................................ 10-005396

(51) Int. Cl.⁷ ............................................... G06F 15/16
(52) U.S. Cl. ........................ 709/217; 358/1.15; 707/10; 707/100
(58) Field of Search ................................ 358/442, 527, 358/500; 707/10, 100, 200, 201, 204; 711/100, 154, 161; 709/217

(56) References Cited

U.S. PATENT DOCUMENTS

| | | | | |
|---|---|---|---|---|
| 5,001,628 A | * | 3/1991 | Johnson et al. | 707/10 |
| 5,327,265 A | * | 7/1994 | McDonald | 358/527 |
| 5,555,388 A | * | 9/1996 | Shaughnessy | 711/100 |
| 5,619,571 A | | 4/1997 | Sandstrom et al. | |
| 5,678,046 A | * | 10/1997 | Cahill et al. | 707/200 |
| 5,760,917 A | * | 6/1998 | Sheridan | 358/442 |
| 5,761,404 A | * | 6/1998 | Murakami et al. | 714/15 |
| 5,784,461 A | | 7/1998 | Shaffer et al. | |
| 5,813,009 A | * | 9/1998 | Johnson et al. | 707/100 |
| 5,949,551 A | * | 9/1999 | Miller et al. | 358/408 |

FOREIGN PATENT DOCUMENTS

| | | |
|---|---|---|
| EP | 0 651 554 A1 | 5/1995 |
| EP | 0 830 008 A2 | 3/1998 |
| GB | 2 080 072 A | 1/1982 |
| WO | 98/31144 | 7/1998 |

* cited by examiner

Primary Examiner—Zarni Maung
Assistant Examiner—Wen-Tai Lin
(74) Attorney, Agent, or Firm—Birch, Stewart, Kolasch & Birch, LLP

(57) ABSTRACT

In a network photograph service which provides digital photographic services on a network, only selected images are shown only to people that a user wishes to show the images, without cost and time upon or after photographing the images. Images registered with a database 16 and the names of albums having been registered (album 1, album 2, and album 3) are shown on a screen of the user's personal computer. The user relates the names of the albums with the images and the correspondence set by the user is stored in the system. When the album name is specified by a user, only the images belonging to the album can be browsed in a unit of an album according to the stored correspondence.

11 Claims, 7 Drawing Sheets

NETWORK PHOTOGRAPH SERVICE SYSTEM

BACKGROUND OF THE INVENTION

1. Field of the Invention

The present invention is related to a network photograph service system which provides a digital photographic service, such as printing, on a network.

2. Description of the Related Art

As a form of digital photographic services, network photograph services have been known. In a network photograph service system, digital images owned by users are stored (registered) in a system of a service provider and printing orders or the like are received via a network such as the Internet.

In such a service, a register ID is issued to a user when the user asks a laboratory to register digital images upon developing a film, for example. The photographs recorded on the film are digitized by the laboratory or by a service center dedicated therefor. The digitized images are stored in a system of the service provider and disclosed on a network. The user can browse among his/her images having been registered, by accessing the system of the service provider via the network. At this time, image browsing is restricted by the register ID. In many cases, browsing is restricted in two steps, by a register ID and a password.

As has been described above, in a network photograph service, image browsing is restricted so that a person other than the owner of an image cannot see the image without permission. However, in the case of photographs taken during a trip with friends for example, the owner of the photographs may wish to let others browse among the images. In this case, in a conventional network photograph service, if the owner lets a person know the register ID or the password, the person can browse through the images.

However, if the register ID or the password is known by a friend of the owner for example, the friend can browse photographs of the owner's family trip if the family trip photographs and the photographs of a trip with the friend have been registered under the same ID and the password. In order to avoid this, the owner of the photographs needs to sort photographs according to a person to browse before registration of the photographs, and to obtain IDs and passwords different for each person to browse.

Many network photograph services which are currently available register images per film, and images belonging to each film are shown as one group upon browsing. Therefore, in order to obtain IDs different for each person or group to browse, images have to be recorded by changing films for each to browse. However, in the case where a film has some exposures left, it is general to continue photographing until the film is finished. In other words, it is not common practice to change films for each person or group to browse.

Furthermore, in the service where image registration is carried out per film, all photographs cannot be seen at once when 2 films of photographs have been taken at a trip, for example.

Moreover, some users may wish to allow different persons to browse the same photographs. For example, a user may wish to show photographs taken at a company trip to his/her colleagues, and also wish to show his/her parents only photographs that the user is in, out of the company trip photographs. In a conventional service where image registration is carried out at each time a film is read, images to be shown cannot be limited for different persons to browse.

Another method wherein registration is carried out not in blocks of images on each film but in any arbitrary unit is possible, although it is not carried out due to complex registration processing. In this method, photographs on 2 films can be registered and shown at one time, and registration of images classified by each person or group to browse is also possible.

However, image registration for each to browse means double registration of the same photographs with a system of a service provider when the same photographs are seen by a plurality of persons, such as the case in the above. In a conventional system, double registration doubles the cost due to memory space occupied by the images or the management fee therefor. Therefore, the service charge is doubled, which is not desirable for both the user and the service provider.

On the other hand, there is another method wherein photographs are shown in different web pages after being digitized at home or at a laboratory and classified for each person or group to browse. However, this kind of task is usually time-consuming and not all users can generate a web page.

SUMMARY OF THE INVENTION

Therefore, demands have been growing for a system wherein images are disclosed on a network only to persons that a user allows to browse through the images, without a trouble during or after photographing of the images and without extra cost. Based on consideration of the above problems, an object of the present invention is to provide a network photograph service system which has a function to carry out such a service in the above, without a load on users and at low cost.

A network photograph service system of the present invention provides various kinds of services using an image disclosed on a network, and comprises:

image recording means for recording a plurality of images therein;

image selecting means for enabling a user of the service to select from images which the user can browse one or a plurality of images belonging to an image group by enabling the name of the image group having been pre-registered and the images recorded in the image recording means to be seen on the network;

image group managing means for managing the image group by recording a correspondence between the name of the image group and the image selected as an image belonging to the image group; and grouped image disclosing means for enabling, based on the recorded correspondence, a user of the service to browse on the network only images belonging to an image group out of the images recorded in the image recording means when the name of the image group is specified by the user.

The "image recording means" means an image database which stores and manages images received from users. Each image is stored and managed as an image file in a large capacity hard disc or the like and the name of the image file is decided upon registration, according to a predetermined rule (for example, a register ID plus the date of image registration). Each image file is read from the hard disc upon necessity. The image recording means may not necessarily be a single recording medium. For example, the image recording means may include a plurality of hard discs. Alternatively, images can be assigned and stored in hard discs of a plurality of server computers in a distributive manner.

The "image selecting means" displays the names of available image groups and images having been stored on a screen of a personal computer of a user who accesses the system via the network, and enables the user to select an image by inputting a number or by clicking a mouse. The user selects an image group and images to be included therein, and presses an OK button, for example. In this manner, the user can define the image group. Alternatively, image groups to be chosen from may be displayed with check boxes under each image so that the image group to which each image belongs can be selected.

It is preferable for the images displayed by the image selecting means to be limited to the images registered by a user as in the case of a conventional network system. However, since the present invention is applicable to not only the images registered by a user but also images provided by service providers for example, the image selecting means does not necessarily have a function for restricting browsing.

The "name of the image group" in this invention means not only a name in characters but also any identifier for identifying an image group. For example, "group A", "company trip", "G001" can be listed as the names of image groups.

The "image group managing means" stores information obtained by the image selecting means, that is, a correspondence between an image group and images belonging to the image group. To store the "correspondence" means to store information showing the correspondence alone, and does not include the case where images are classified and recorded in the image groups. In other words, even in the case where one image belongs to a plurality of image groups, the image is recorded once and not copied to be recorded under each image group.

As a method to store the correspondence, a table relating the name of an image group to the names of image files may be used. Alternatively, each image may have accompanying information showing the name of an image group to which it belongs.

In other words, in a conventional system, images can be grouped only by being stored in each group they belong to, while the present system can define an image group by recording the correspondence.

The "grouped image disclosing means" displays the names of available image groups on a screen of a personal computer of a user who has accessed to the system via the network so that the user can specify the image group he/she needs. The grouped image disclosing means then displays only images belonging to the image group by using the stored correspondence to find the images.

On this occasion, the grouped image disclosing means may restrict browsing of the images in the specified image group by allowing only a user who has input a pre-registered password to browse the images.

It is preferable for the above system to further comprise image group registering means for enabling a user to register an image group on the network. In other words, the "image group names having been pre-registered" may be fixed to names determined by a service provider, such as "group A", "group B" or "group C", but it is more preferable for the system to have a function which allows a user to register on the network any image group name such as "company trip" or "Christmas party".

On this occasion, not only the image group name but also a password may be set so that the correspondence between the name of the image group set by the user and the password to limit browsing of the images belonging to the image group is stored. In this manner, it becomes possible for the password to restrict browsing in conjunction with the grouped image disclosing means.

Furthermore, the system may further comprise comment attaching means for enabling a user on the network to attach a comment to an image disclosed by the grouped image disclosing means so that the grouped image disclosing means can display comment information attached to the image together with the image.

Moreover, the system may comprise print ordering means for ordering prints of the images disclosed on the network by the grouped image disclosing means.

According to the network photograph service system of the present invention, a user can classify images having been registered while browsing them on the network, by using the function of the image selecting means. Therefore, no classification upon image registration is necessary and images can be classified regardless of the unit in which images are registered.

Information regarding the classification input by the user is stored by the image group managing means as the correspondence between the name of the image group and the images. Therefore, in the case where photographs taken at a company trip and a family trip have been registered together, only the photographs regarding the company trip can be disclosed to colleagues as an image group and no photographs of the family trip will be seen by the colleagues.

In other words, according to the system of the present invention, a user can show only the images he/she wishes to show only to persons he/she wishes to show the images by accessing the system via the network and carrying out a simple setting or selection. Therefore, by a simple operation, a user can compose his/her electronic album on the system of a service provider and share the album with his/her acquaintances on the network.

If the grouped image disclosing means allows only the users who have input a predetermined password to browse images belonging to the image group, images with high secrecy can be disclosed safely.

If the system comprises the image group registering means so that a user can register an image group having any image group name on the network, the kind of the images belonging to each image group can be guessed, which is convenient for users.

As for passwords, they may be issued by a service provider. However, if a password can be freely set by a user, it is more convenient for users.

Moreover, if the accompanying information showing the name of the image group that each image belong to is attached to each image when a correspondence between the name of the image group and the image belonging to the group is stored by the image group managing means, there will be no contradiction due to a correspondence having been deleted in the case where corresponding images are deleted together with the correspondence after a predetermined storage period has passed, for example. In other words, if the correspondence is stored in a table showing the relation between the name of the image group and the names or IDs of the images, the correspondence table needs to be updated upon deletion or addition of an image belonging to the image group. On the other hand, in the method wherein the name of an image group is attached to an image file, it is not necessary to update the correspondence, which leads to comparatively easier management.

In the above system, if a person who has viewed a disclosed image can attach a comment thereto and if the attached comment can be viewed by a person who views the image thereafter, comments can be made on an image on the network in the same manner as writing a comment on a paper album being circulated.

Furthermore, if printing of an image disclosed by the grouped image disclosing means can be ordered, a photographer does not need to ask his/her acquaintances regarding additional printing orders, and each person can order printing of an image he/she needs by browsing through the disclosed images.

DESCRIPTION OF THE PREFERRED EMBODIMENT

Hereinafter, an embodiment of the present invention will be explained referring to the accompanying drawings. An outline of a network photograph service system will be explained first.

Figure 1:
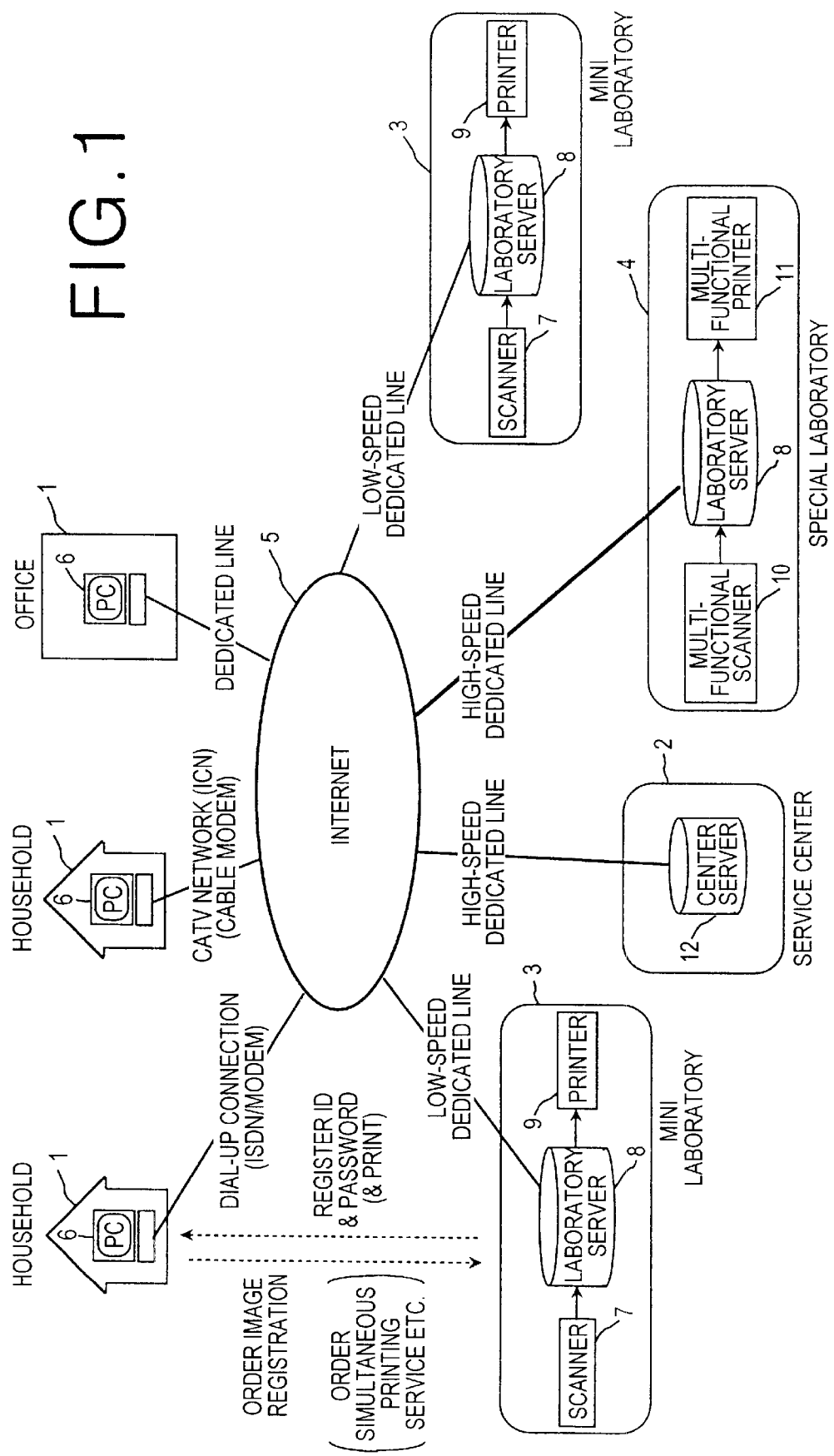
FIG. 1 is a diagram showing an outline of a network photograph service system.

FIG. 1 is a diagram showing the outline of the network photograph service system in an embodiment of the present invention. As shown in FIG. 1, the system provides a digital photographic service on a network to a user 1 by exchanging information via the Internet 5 between a service center 2 for receiving a service order and a mini-laboratory 2 for carrying out printing or a special laboratory 4 comprising special equipment. On this occasion, a connection to the Internet can be realized by any known form such as a dedicated line, a dial-up connection, or a CATV network. However, since the service center and the special laboratory are especially busy to communicate, a connection by a high-speed dedicated line is desirable.

Image data are input to this system by the mini-laboratory 3. For example, the mini-laboratory 3 usually develops a film, reads the developed film by using a scanner 7, and carries out a simultaneous printing service which generates prints by using a printer 9. When image registration is also ordered by the user upon requesting the simultaneous printing service, image data read from the film are registered with a database managed by a laboratory server 8, and a form describing the register ID and a password regarding the images is returned to the user together with the generated prints.

Figure 2:
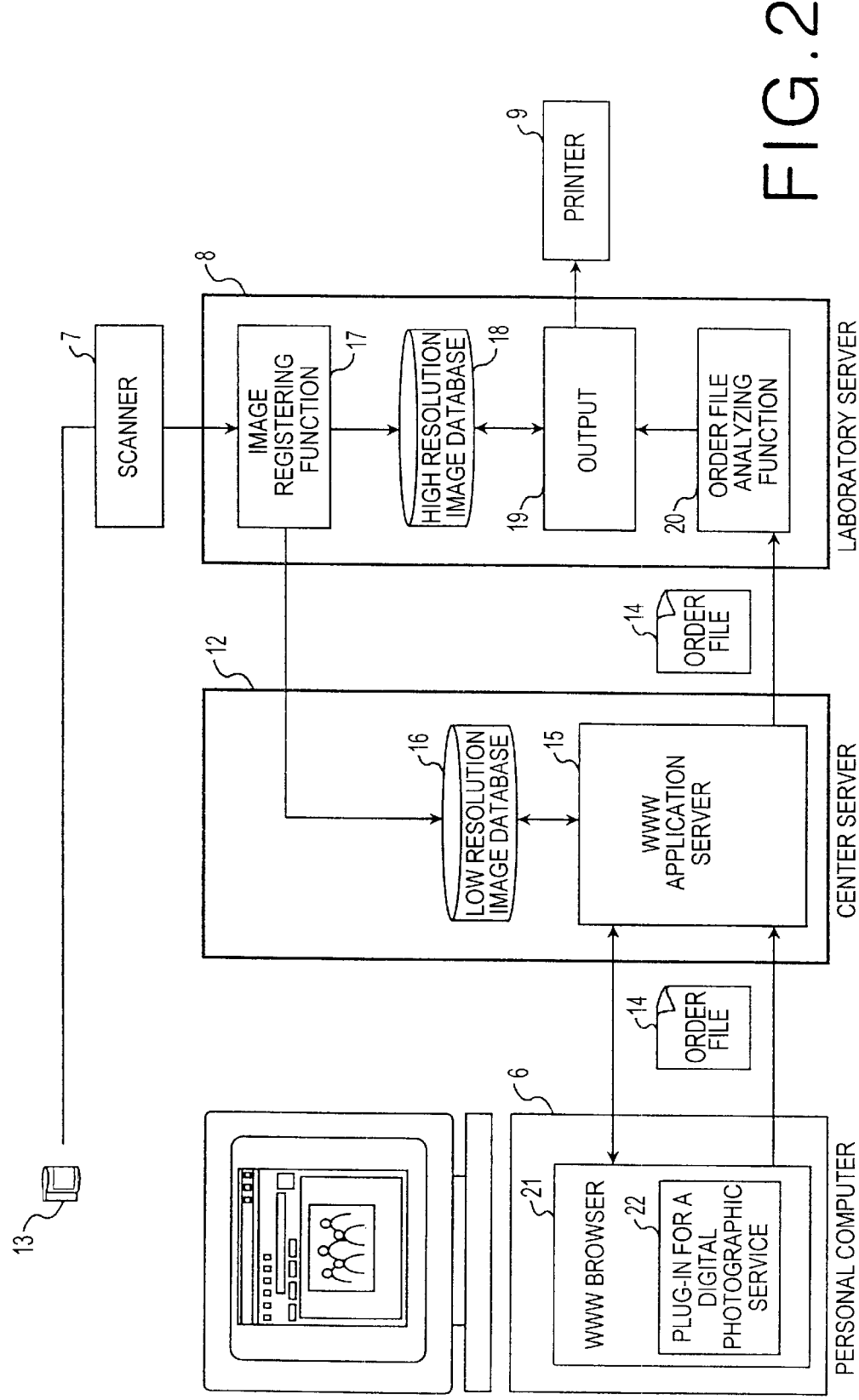
FIG. 2 is a diagram showing a configuration of the network photograph service system.

FIG. 2 is a diagram showing configurations of a personal computer 6 of the user 1, a center server 12 of the service center 2, and the laboratory server 8 of the mini-laboratory 3 or the special laboratory 4 in the system shown in FIG. 1.

As has been described in the above, when the user requests registration of images, an image registering function 17 of the laboratory server 8 registers the image data read from a film 13 by the scanner 7 with a high resolution image database 18 managed by the laboratory server 8. Furthermore, low resolution images (hereinafter called thumbnail images) having a lower resolution than that of the original image data are generated and recorded in a low resolution image database 16 managed by the center server 12 at the service center 2.

The image data stored in the high resolution image database 18 are used for printing, while the thumbnail images in the low resolution image database 16 are used by the user upon browsing among the images on a screen of his/her personal computer. Therefore, the thumbnail images do not need to have especially high quality. Since the center server 12 has to store all thumbnail images transferred from all laboratories, it is preferable for the thumbnail images to have smaller data sizes to save the disc space. In this embodiment, image data to be stored in the high resolution image database have 4 bases of pixels (approximately 1024× 1792) which is necessary for printing in an L size at 300 dpi. On the other hand, a thumbnail image for browsing has ¼ of a base of pixels (approximately 368×256).

The center server 12 at the service center 2 provides various kinds of services to the user 1 by disclosing on the network the thumbnail images stored in the low resolution image database 16.

The above-described services are provided in the form of web pages by a WWW application server 15. A program necessary to use such services is provided to the user 1 in advance. In the example shown in FIG. 2, a plug-in 22 for a digital photographic service, which enables browsing, downloading, and ordering printing of the registered images, is provided to the user. The user can browse the thumbnail images by accessing the web page of the center server 12 after installing the plug-in 22 to a WWW browser 21 such as Netscape Navigator. Furthermore, the user can request various kinds of digital photographic services, such as printing, regarding the image he/she views.

When the user has input order information on the image to be printed, such as the image ID, the quantity and the size of prints, in order to request a printing service, an order file 14 describing the order information in a predetermined data format is generated and transferred to the application server 15 of the center server 12.

The WWW application server 15 finds the laboratory storing the high resolution image corresponding to the requested image according to the image ID described in the order file, and transfers the order file 14 to the laboratory server 8 at the laboratory having been found. The laboratory server 8 analyzes the content of the order file 14 by using an order file analyzing function 20, reads image data to be printed from the high resolution image database 18, carry out image processing (not shown) such as enlargement or reduction upon necessity on the image data having been read out, and orders printing to the printer 9 by transferring the processed image data.

As has been described above, the network photograph service system provides a variety of services by disclosing thumbnail images to users. In a conventional network photograph service system, disclosure of thumbnail images is carried out by grouping images registered at the same time (in units of registration). In other words, when the user 1 requests registration of all images recorded on a film to the mini-laboratory 3, one resister ID and one register password are issued for the entire images on the film. The user can browse through all images on the film by inputting the register ID and the password to the system.

The network photograph service system of the present invention is characterized by that it comprises an image disclosing function which allows image disclosure using an image group set by the user as a unit of disclosure, in addition to the image disclosing function in units of registration. Hereinafter, the image group set by the user is called a network album.

Figure 3:
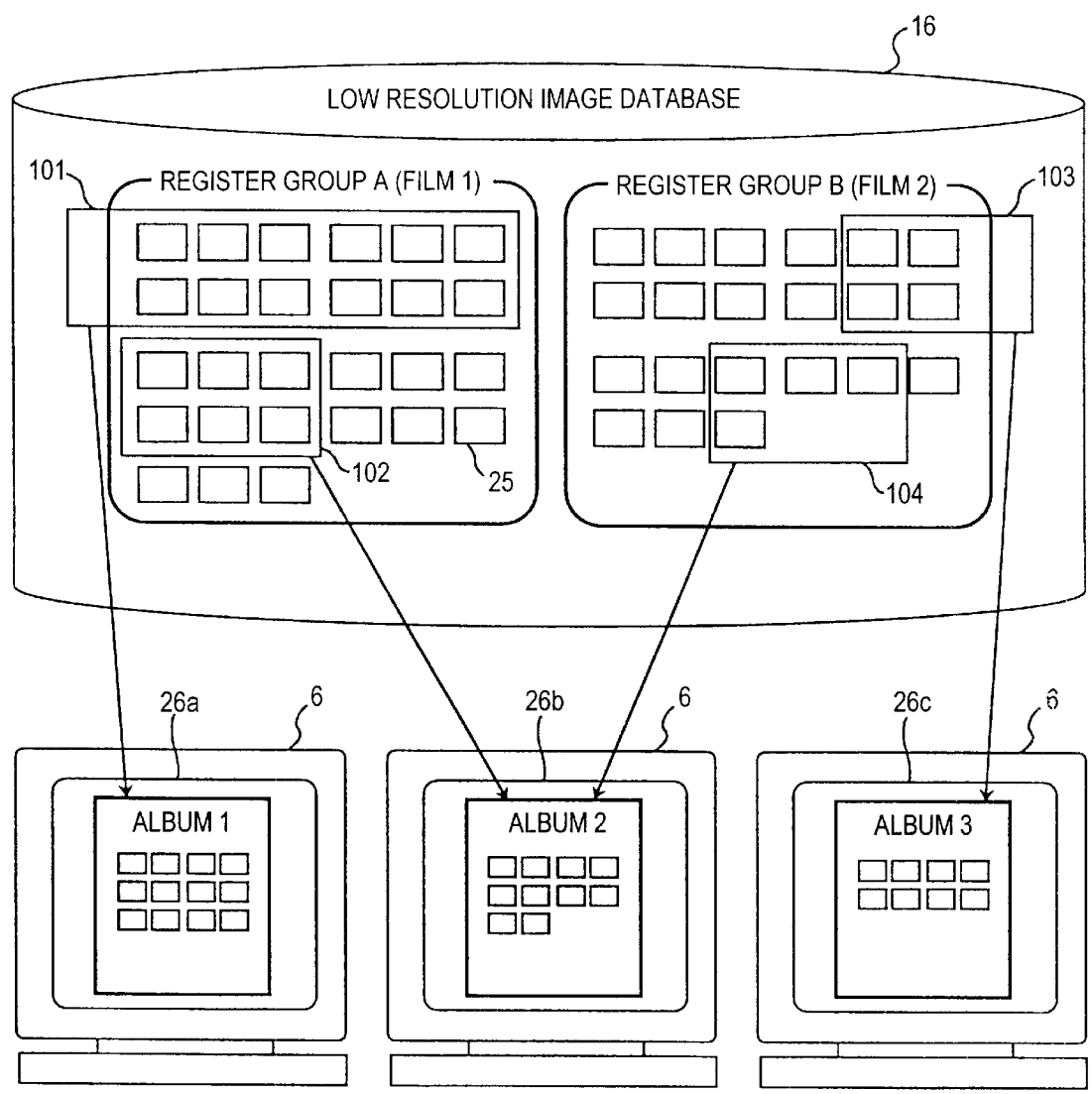
FIG. 3 is a diagram showing an idea of a network album.

FIG. 3 is a diagram showing an idea of the network album. For example, assume a case where a user has photographed images on 2 films and registered all images with the system. On this occasion, the system registers the images only in a film batch. Therefore, thumbnail images 25 for 27 exposures on a first film are registered as a group A and thumbnail images 25 for 21 exposures on a second film are recorded as a group B in the low resolution image database 16. Two register IDs are issued to the user.

In a conventional system, when a user browses through the thumbnail images, he/she can only browse through the all images in group A or B. However, in the network album of the present invention, as shown in FIG. 3, the user can generate an album by selecting any images from the images having been registered. In this manner, the selected images can be disclosed as a group regardless of the classification of images upon registration.

For example, among the images in the register group A, a first network album 26a shown in FIG. 3 contains only the images surrounded by a frame 101. A second network album 26b is an album containing 6 images surrounded by a frame 102 selected from the images in the register group A and 4 images surrounded by a frame 104 selected from the images in the register group B. A third network album 26c is an album containing 8 images surrounded by frames 103 and 104 selected from the images in the register group B.

More specifically, if 12 photographs at a family trip have been recorded on the first film and photographs of a company trip have been recorded on the rest of the first film and also on the second film because of shortage of exposures on the first film for example, the family trip photographs can be viewed by colleagues in a conventional system by disclosure of the register group A. However, if the user generates the network album 26a by grouping the photographs at the family trip (images surrounded by the frame 101) and the network album 26b for the entire people in the company by selecting and grouping the company trip photographs which have come out satisfactory, as well as the network album 26c for his/her peers in the company, only selected photographs are shown only to people the user wishes to show.

In the above-described example, 4 images surrounded by the frame 104 in the register group B belong to 2 network albums. However, the thumbnail images stored in the low resolution image database 16 are not copied. In other words, a network album is merely information showing a correspondence between the name of an album and images belonging thereto, and the image data themselves are not stored according to classification. Therefore, a hard disc space for realizing the function of the network album does not increase extremely, compared with that of a conventional system.

Figure 4:
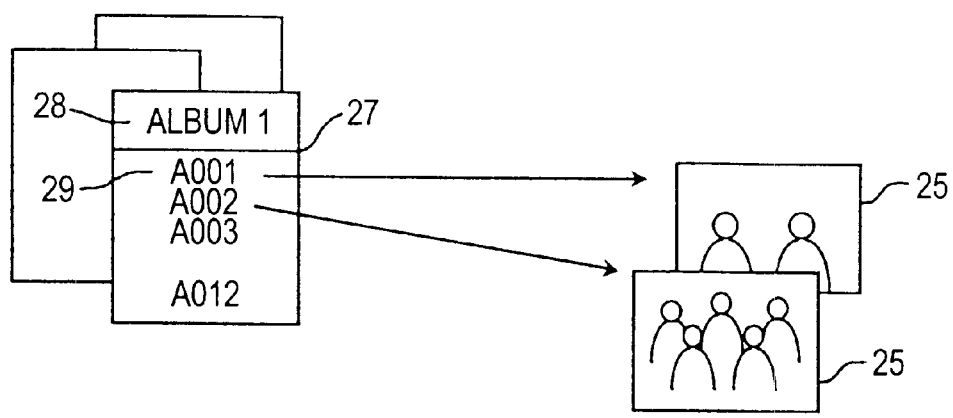
FIG. 4 is a diagram showing an example of how a correspondence between the name of a network album and an image is stored.
Figure 5:
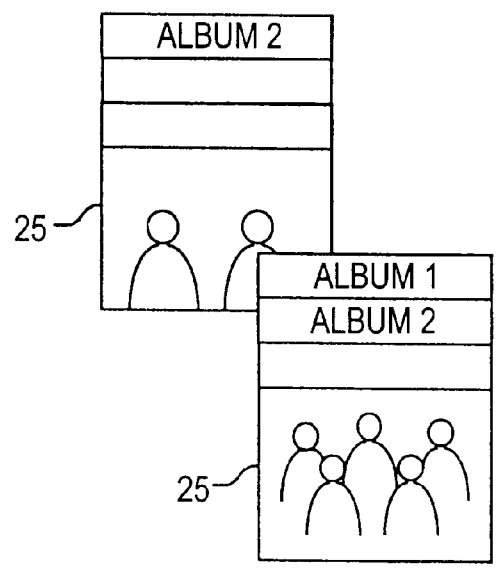
FIG. 5 is a diagram showing another example of how the correspondence between the name of a network album and an image is stored.

FIGS. 4 and 5 show examples of how the correspondence between the name of an album and images is stored. In FIG. 4, a table to show the correspondence between the name of the network album and the image ID is stored. If an image ID comprising the register group name and a serial number is attached to each of the thumbnail images 25, an album name 28 and an image ID 29 of an image belonging to the network album is stored in a correspondence table 27, as shown in FIG. 4. In this case, when a user specifies a network album, the WWW application server 15 searches for the correspondence table for the specified network album and sequentially reads thumbnail images 25 having the image IDs recorded in the table from the low resolution image database 16 to display them on the screen of the personal computer 6 of the user. In this manner, the network album function can be realized.

Meanwhile, FIG. 5 shows the case where each of the thumbnail images 25 is stored in an image file and the correspondence is stored by describing the name of an album (or an album ID or the like indicating the album) that the image belongs to in an area 30 set in the header of the image file. In this case, the WWW application server 15 sequentially confirms the file header of the thumbnail image 25 registered by the user and displays the thumbnail image when the album name specified by the user is included in the header, and does not display the thumbnail image if otherwise. In this manner, the above network album function can be realized.

In the example in FIG. 5, the format of the file header should be defined in advance. The number of the network albums that one image can belong to should be prefixed as well. In other words, if the areas 30 for describing the name of the album are limited to 3, one image cannot belong to more than 3 network albums.

On the other hand, there is no such restriction in the example shown in FIG. 4. However, in the example shown in FIG. 4, when image data in the database are deleted after a predetermined hold period has elapsed, the correspondence table has a contradiction if it stays as it is. Therefore, the system needs to carry out processing such as rewriting on the table.

Meanwhile, in the example shown in FIG. 5, although it has a disadvantage as has been described above, the network albums are maintained without contradiction, since image data are deleted together with the file containing the data.

Figure 6:
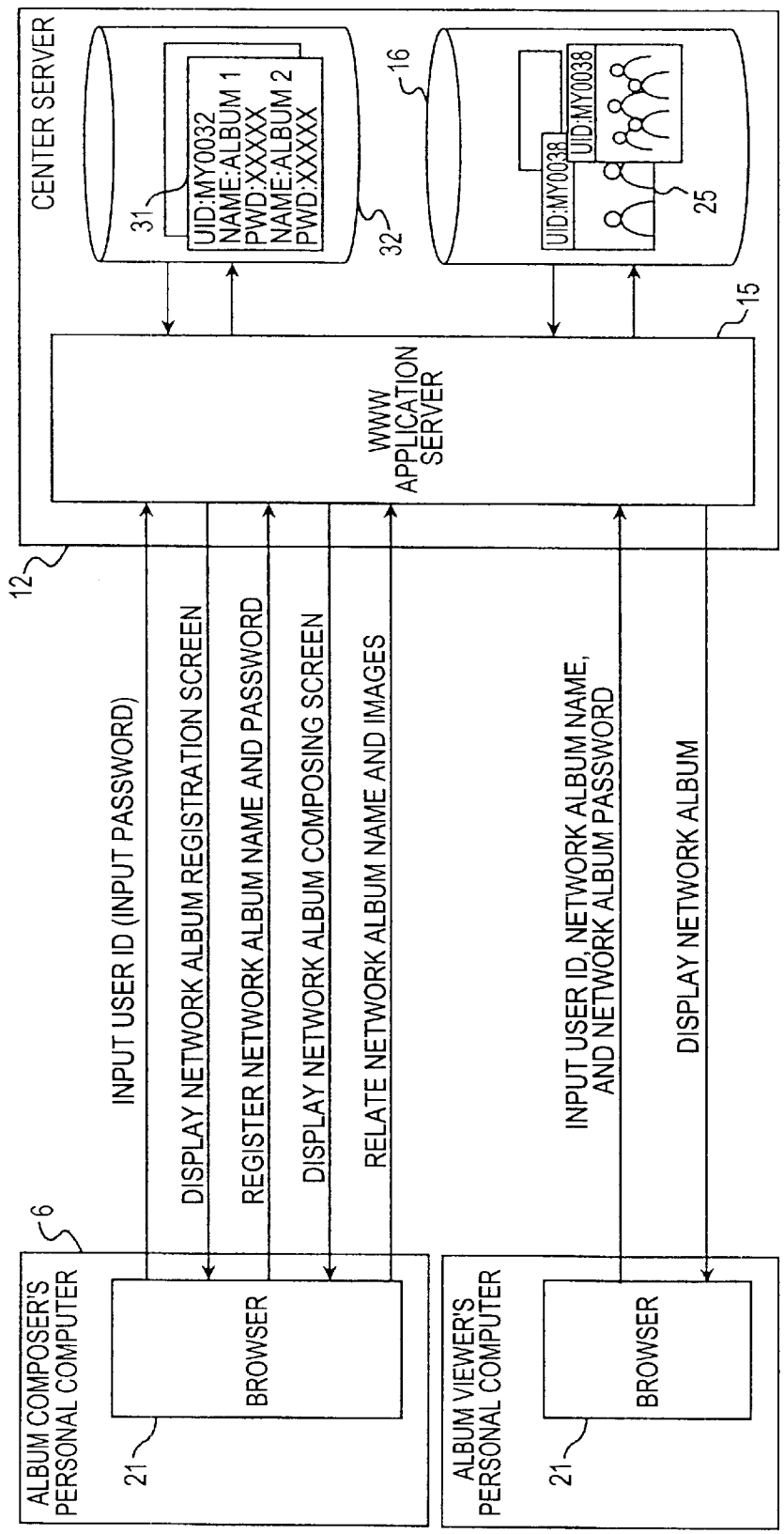
FIG. 6 is a diagram showing how the network album is composed and browsed.

The idea and implementation of the network album have been described in the above. Processing for composing and browsing the network album will be described next. FIG. 6 shows the processing carried out between the personal computer 6 of the user and the center server 12 (more precisely, the processing carried out between the browser 21 and the WWW application server 15).

The WWW application server 15 requests the user who has accessed to input the user ID and the user password. The user ID is different from the register ID and only one user ID is assigned to each user. The system manages various kinds of information regarding users by using the user IDs. Therefore, in order to manage which user has registered which network album, the system needs to record the correspondence between the user ID and the name of the network album.

Therefore, in order to register a network album, the user should register his/her user ID with the service provider first. In the explanation below, the user ID is assumed to have been registered.

The WWW application server 15 compares the user ID and the user password having been input by the user with the user ID and the user password registered as user information 31 managed by a user information database 32. When the user ID and the user password input by the user are valid, a main menu is shown on the screen. On the main menu screen, the user first selects a network album item in order to register (define) a network album.

When the network album item is selected, a network album registration screen appears on the screen of the user's personal computer. In this embodiment, the user can register the network album by inputting the name of a desired network album and a network album password in specified boxes on the screen. The network album name and the network album password are recorded as a portion of the user information 31 in conjunction with the user ID, as shown in FIG. 6. Once the network album registration has been finished, the screen goes back to the main menu.

When a network album composition item is selected next on the main menu screen, the WWW application server 15 searches the low resolution image database 16 for the thumbnail images corresponding to the user ID input on the initial screen and reads the images therefrom. This search can be realized by insertion of the user ID in the header of the image files upon image registration, for example. The WWW application server 15 displays the thumbnail images having been read on the screen of the user's personal computer, together with the network album name having been registered by the user.

Figure 7:
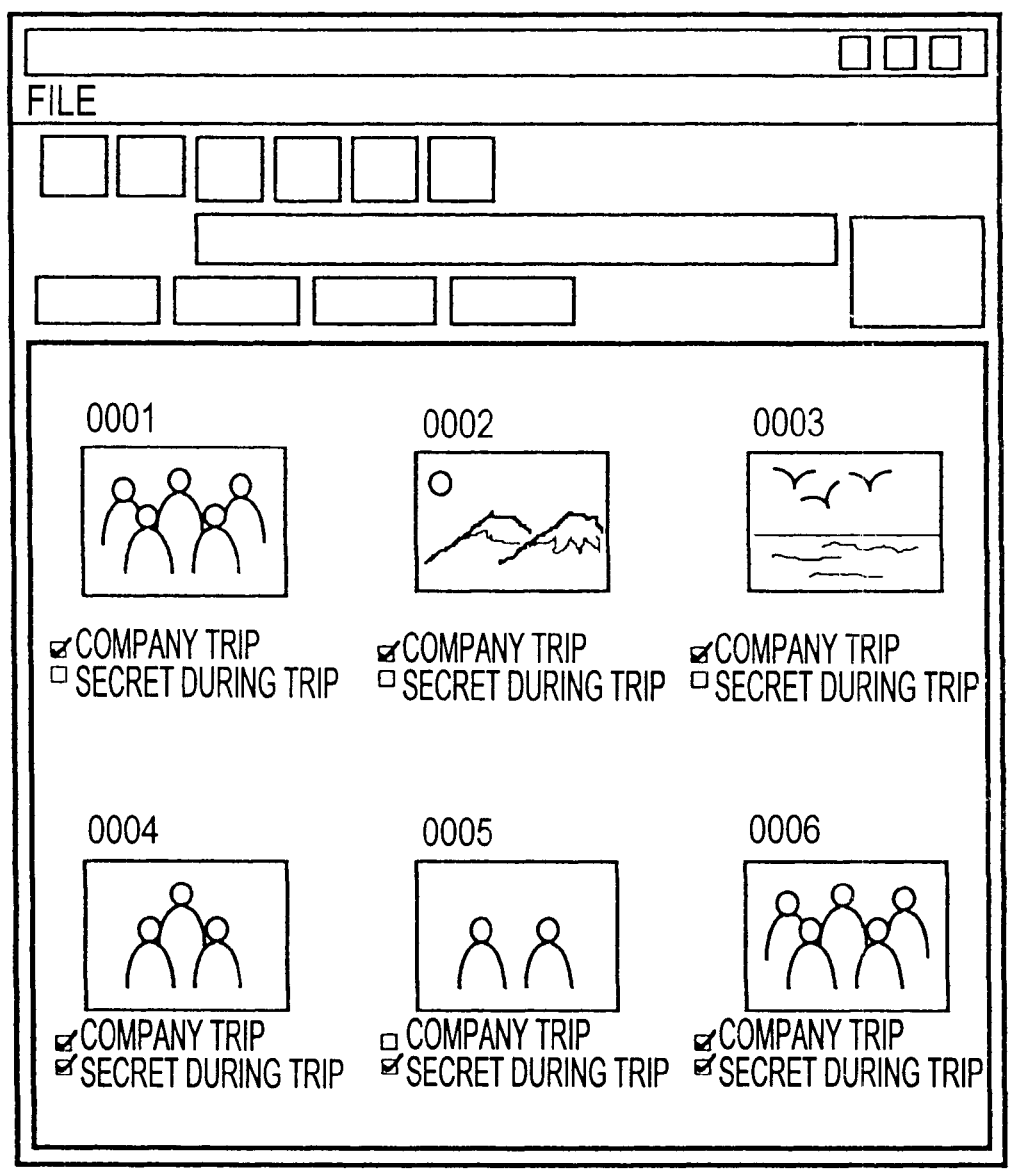
FIG. 7 is a diagram showing an example of a network album composing screen.

FIG. 7 shows an example of the network album composition screen. In this example, the network album names having been registered and check boxes therefor are shown under each image. The user decides the network album to which each image belongs, and relates the network album name to the image by checking one of the check boxes indicating the network albums. FIG. 7 shows the case where image IDs 0001, 0002 and 0003 belonging only to a network album "company trip", an image ID 0005 belonging only to a network album "secrets during trip", and the rest 2 images belonging to both network albums have been specified. The correspondence specified by the user is stored by the WWW application server 15 in the form shown in FIG. 4 or 5, for example.

The network album composed through the processing in the above can be viewed by not only the album composer but also all users who know the user ID, the network album name, and the network album password. In this embodiment, user password input is not required upon browsing through an album. Therefore, the album composer does not need to let a person to view the album know his/her user password.

When the album viewer inputs the user ID on the web page screen, the WWW application server 15 reads the names of the network albums registered under the name of the user ID having been input from the user information 31 stored in the application server, and displays the album names on the screen. The album viewer selects a network album to browse, and inputs the network album password. The WWW application server 15 compares the network album password having been input with the network album password stored in the user information 31, and judges the validity of the network album password. When the network album password is valid, the network album is displayed.

Figure 8:
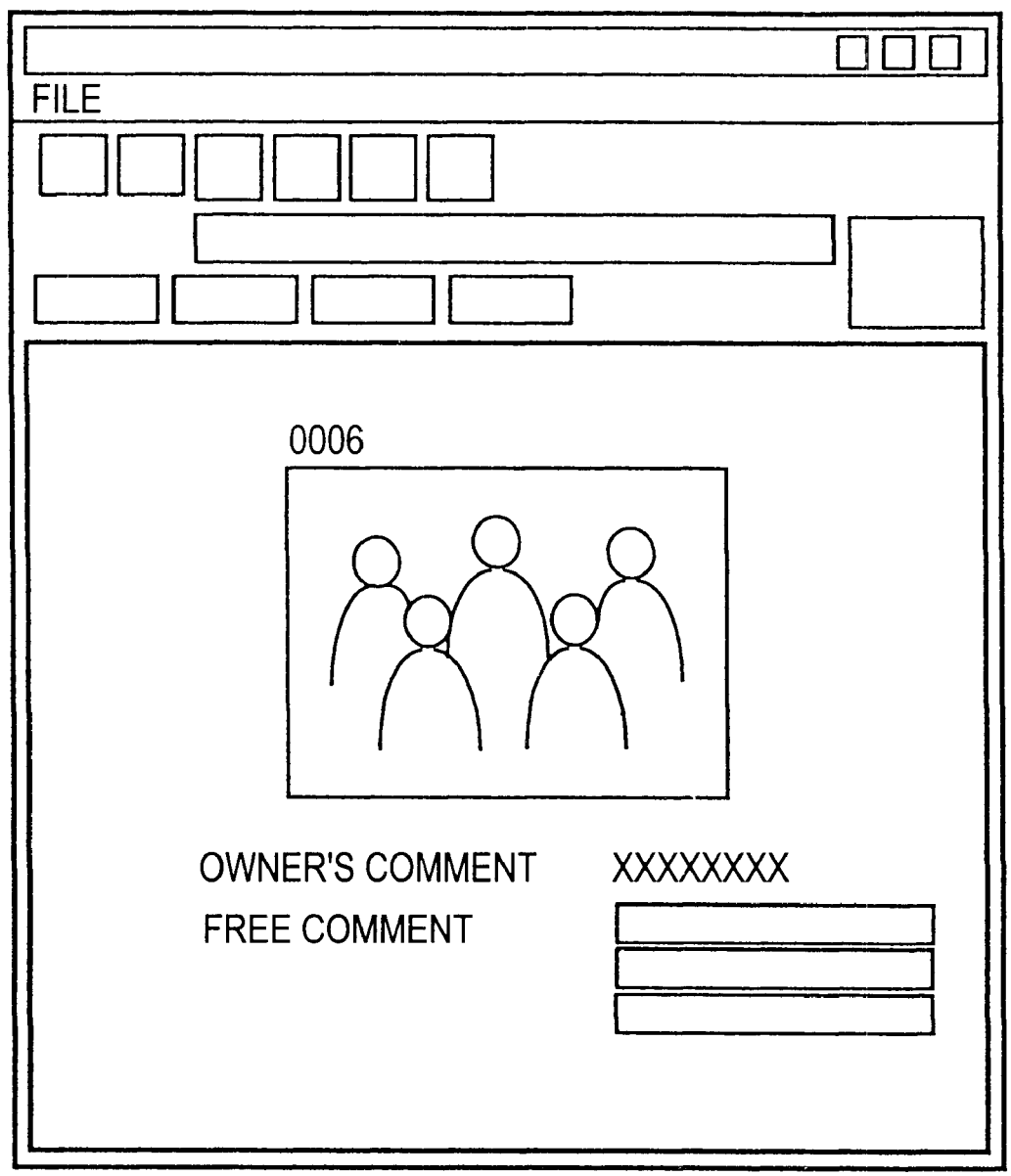
FIG. 8 is a diagram showing an example of a comment attaching function.

The album viewer can view an enlarged thumbnail image when one of the thumbnail images displayed as the network album is selected. FIG. 8 shows an example of the zoom-in screen. In this embodiment, a comment can be browsed or attached to the image on this screen. In the example shown in FIG. 8, the comment made by the composer of the network album is shown as an owner's comment under the image. Furthermore, a box as a free comment space is shown so that the album viewer can input a comment. The comment input by the album viewer is displayed when the album composer or another album viewer browses the network album thereafter. Moreover, not only a written comment but also a spoken comment may be attached to an image.

The image disclosed as the network album can be printed in the method shown in FIG. 2. In other words, although the unit of disclosure of thumbnail images is different, the user can request on the network various kinds of services regarding images browsed as a portion of the network album, in the same manner as in the conventional disclosure in registration units.

According to the network album function included in the network photograph service system of the present invention, a user can share an electronic album with his/her acquaintances on a network. Furthermore, by sharing an album on the network, various new services such as the comment attach service in the above can be provided. Moreover, photographs can be disclosed to unspecified viewers without restriction on browsing by the network album password. In other words, the network album is not merely a digitized, on-line version of a conventional paper album, but also adds more values.

What is claimed is:

1. A network photograph service system for providing various kinds of services using an image disclosed on a network, said network photograph system comprising:

image recording means for recording a plurality of images registered to an owner;

image selecting means for enabling the owner of the recorded images to select from amongst the recorded images at least one or a plurality of images and independently classify the selected one or plurality of images into an image group or a plurality of groups by enabling a pre-registered name of the image group and the images recorded in the image recording means are capable of being seen on the network;

image group managing means for managing the image group by recording a correspondence based on the classification of images between an image and the name of the image group to which the image belongs; and grouped image distributing means for enabling, based on the recorded correspondence, a third-party user of the service to browse on the network only those images belonging to an image group to which access has been granted out of all of the images recorded in the image recording means.

2. The network photograph service system as claimed in claim 1, wherein the grouped image distributing means allows only a service user who has input a pre-registered password to browse images belonging to the image group.

3. The photograph service system as claimed in claim 1, further comprising image group registering means for enabling the owner of the recorded images on the network to register an image group name.

4. The network photograph service system as claimed in claim 3, wherein the image group registering means stores the name of the image group that the service user sets and a password to restrict browsing of the image belonging to the image group by relating the image group name and the password.

5. The network photograph service system as claimed in claim 1, wherein the image group managing means manages the image group by attaching accompanying information showing the name of the image group to each image belonging to the image group.

6. The network photograph service system as claimed in claim 1, further comprising comment attaching means for enabling the owner of the recorded images on the network to attach a comment to an image distributed by the group image distributing means, and said group image distributing means enabling information regarding the comment attached to each image to be browsed together with the image.

7. The network photograph service system as claimed in claim 1, further comprising print ordering means for enabling printing of an image distributed by the grouped image distributing means to be ordered on the network.

8. A network photograph service system according to claim 1, wherein the correspondence between the image and the name of the image group to which it belongs is recorded in a table.

9. The network photograph service system according to claim 1, wherein the image group comprises images selected from all of the images that had been registered to the owner in the image recording means up to the point where the owner makes the selections for the image group.

10. The network photograph service system according to claim 1, wherein the selected image can be classified in more than one group.

11. The network photograph service system according to claim 10, wherein the image classified in more than one group is only recorded once in the recording means and is not recorded under each image group.

* * * * *